(12) United States Patent
Deng et al.

(10) Patent No.: US 11,567,515 B2
(45) Date of Patent: Jan. 31, 2023

(54) RAPID DOME LOADING PILOT VALVE BYPASS

(71) Applicant: Emerson Automation Solutions Final Control US LP, Stafford, TX (US)

(72) Inventors: Calvin Deng, Stafford, TX (US); William Bockeloh, Stafford, TX (US)

(73) Assignee: Emerson Automation Solutions Final Control US LP, Stafford, TX (US)

( * ) Notice: Subject to any disclaimer, the term of this patent is extended or adjusted under 35 U.S.C. 154(b) by 93 days.

(21) Appl. No.: 16/933,472

(22) Filed: Jul. 20, 2020

(65) Prior Publication Data
US 2021/0018943 A1  Jan. 21, 2021

Related U.S. Application Data

(60) Provisional application No. 62/876,287, filed on Jul. 19, 2019.

(51) Int. Cl.
| | |
|---|---|
| *G05D 16/16* | (2006.01) |
| *F16K 17/164* | (2006.01) |
| *F16K 15/18* | (2006.01) |
| *F16K 31/124* | (2006.01) |

(52) U.S. Cl.
CPC ......... *G05D 16/16* (2013.01); *F16K 15/1826* (2021.08); *F16K 17/164* (2013.01); *F16K 31/1245* (2013.01); *Y10T 137/7758* (2015.04)

(58) Field of Classification Search
CPC . Y10T 137/7758; G05D 16/16; F16K 17/164; F16K 31/1245; F16K 15/1826
See application file for complete search history.

(56) References Cited

U.S. PATENT DOCUMENTS

| | | | | |
|---|---|---|---|---|
| 2,543,846 A | * | 3/1951 | Griswold | F16K 17/105 |
| | | | | 137/488 |
| 3,579,988 A | * | 5/1971 | Firth | F16H 61/462 |
| | | | | 60/449 |
| 3,583,432 A | | 6/1971 | Powell et al. | |
| 3,922,111 A | * | 11/1975 | Deters | F04B 49/022 |
| | | | | 137/491 |
| 3,977,423 A | * | 8/1976 | Clayton | G05D 16/166 |
| | | | | 137/487 |

(Continued)

FOREIGN PATENT DOCUMENTS

| | | |
|---|---|---|
| GB | 1068447 | 5/1967 |
| KR | 20050018909 A | 2/2005 |

OTHER PUBLICATIONS

Emerson Anderson Greenwood Series 200/400/500/700/800 Pilot Operated Relief Valves, technical data, Copyright 2017 Emerson, 64 pages.

(Continued)

*Primary Examiner* — Craig M Schneider
*Assistant Examiner* — Frederick D Soski
(74) *Attorney, Agent, or Firm* — Quarles & Brady LLP (57) ABSTRACT

A flow arrangement for a pressure relief valve assembly can include a bypass flow path extending from a pressure source to a dome of a relief valve. The bypass flow path can include a valve that is configured to open and close the bypass flow path based on pressure at the pressure source or the dome, or a pressure difference between the pressure source and the dome.

20 Claims, 9 Drawing Sheets

(56) References Cited

U.S. PATENT DOCUMENTS

| | | | |
|---|---|---|---|
| 4,274,440 A * | 6/1981 | Richard, Jr. | G05D 16/163 137/489 |
| 4,586,533 A | 5/1986 | Estes | |
| 4,705,065 A | 11/1987 | McNeely et al. | |
| 4,779,639 A | 10/1988 | Loos et al. | |
| 5,027,852 A | 7/1991 | McNeely | |
| 5,348,036 A * | 9/1994 | Oksanen | G05D 7/03 137/489.5 |
| 6,318,406 B1 | 11/2001 | Conley | |
| 10,495,260 B2 * | 12/2019 | Ishida | F17C 13/04 |
| 10,634,003 B2 * | 4/2020 | Masias | F02C 7/22 |
| 2005/0252554 A1 * | 11/2005 | Partridge | F17D 1/20 137/488 |
| 2008/0251130 A1 * | 10/2008 | Folk | G05D 16/163 137/489.5 |
| 2008/0251146 A1 * | 10/2008 | Folk | F16K 31/1262 137/12 |
| 2010/0071787 A1 * | 3/2010 | Folk | F16K 31/365 137/625.61 |
| 2013/0213496 A1 * | 8/2013 | Lybarger | F16K 17/00 137/485 |
| 2015/0114491 A1 * | 4/2015 | Oksanen | G05D 7/03 137/487 |
| 2015/0114492 A1 * | 4/2015 | Oksanen | G05D 7/03 137/487 |
| 2016/0356389 A1 * | 12/2016 | Masias | G05D 16/16 |

OTHER PUBLICATIONS

Emerson Anderson Greenwood Series 5200 Pilot Operated Pressure Relief Valves, technical data, Copyright 2017 Emerson, 20 pages.

Groth Corporation Pilot Operated Relief Valve Series 1660A, technical data, Section 6:1660 Brch.qxd, Jun. 2002, 2.5m, Groth Corporation, a Continental Disc company, Stafford, TX, USA.

\* cited by examiner

RAPID DOME LOADING PILOT VALVE BYPASS

CROSS REFERENCE TO RELATED APPLICATIONS

This application claims priority to U.S. Provisional Patent Application No. 62/876,287, titled "Rapid Dome Loading Pilot Valve Bypass" and filed Jul. 19, 2019, the entirety of which is incorporated herein by reference.

BACKGROUND

Pilot-operated relief valves can be used in a variety of industrial, commercial, and other settings to relieve pressure from a system during overpressure events. Unlike direct acting relief valves, conventional pilot-operated relief valves include a main valve for control of relief venting and a pilot valve to control operation of the main valve. In some arrangements, the main valve has a dome which is pressurized by a fluid that flows from a pressure source through the pilot valve so that the pressure above and below the main valve are substantially equal during normal operation (e.g., after initial loading of the dome). The pilot valve can be configured to provide a particular set pressure, so that if the pressure in the main system line exceeds the set pressure, the fluid connection between the dome and the pressure source is closed and, eventually, a dome-exhaust flow path in the pilot valve is opened to exhaust fluid from the dome. This can allow the main valve to open to vent excess pressure from the system line. When the system line pressure is below the set pressure, the dome-exhaust flow path can close and the pilot valve can, as appropriate, direct flow from the pressure source to re-pressurize the dome.

SUMMARY

Some embodiments provide a flow arrangement for use with a pilot-operated relief valve that is disposed between a pressure source and an outlet, and that includes a dome, a pilot valve, and a pilot-valve flow path from the pressure source to the dome via the pilot valve. The flow arrangement can include a bypass flow path extending from the pressure source to the dome and a bypass valve disposed along the bypass flow path between the pressure source and the dome. The bypass valve can be configured to open the bypass flow path to flow between the pressure source and the dome over a first range of pressures at the pressure source or the dome, and to close the bypass flow path to flow between the pressure source and the dome over a second range of pressures at the pressure source or the dome.

Some embodiments provide a relief valve assembly. The relief valve assembly can include a relief valve having a dome, a pilot valve, a pilot-valve flow path from a pressure source to the dome, in parallel with the pilot-valve flow path, and a bypass valve disposed along the bypass flow path between the pressure source and the dome. The bypass valve can be configured to open the bypass flow path, based upon pressure at the pressure source, for flow from the pressure source to the dome.

Some embodiments provide a method of loading a dome of a pilot-operated relief valve that is disposed between a pressure source and an outlet, and that includes a dome, a pilot valve, and a pilot-valve flow path from the pressure source to the dome via the pilot valve. The method can include installing a bypass valve along a bypass flow path between the pressure source and the dome. The method can also include configuring the bypass valve to automatically open the bypass flow path for flow between the pressure source and the dome only for a range of pressures at the pressure source, at the dome, or for a pressure difference between the pressure source and the dome.

Some embodiments provide a flow arrangement for use with a pilot-operated relief valve that is disposed between a pressure source and an outlet and that includes a dome, a pilot valve, and a pilot-valve flow path from the pressure source to the dome via the pilot valve. A bypass flow path can extend from the pressure source to the dome. A bypass valve can be disposed along the bypass flow path between the pressure source and the dome. The bypass valve can be configured to: automatically open the bypass flow path to flow between the pressure source and the dome based on the pressure source or the dome exhibiting a first range of pressures; and automatically close the bypass flow path to flow between the pressure source and the dome, based on the pressure source or the dome exhibiting a second range of pressures different from the first range of pressures.

Some embodiments provide a relief valve assembly including a relief valve having a dome and a pilot valve. A pilot-valve flow path can extend between a pressure source and the dome via the pilot valve. A bypass flow path can extend between the pressure source and the dome, in parallel with the pilot-valve flow path. A bypass valve can be disposed along the bypass flow path between the pressure source and the dome. The bypass valve can be configured to automatically open the bypass flow path, based upon pressure at the pressure source or the dome, to temporarily fluidly couple the pressure source and the dome.

Some embodiments provide a method of loading a dome of a pilot-operated relief valve that is disposed between a pressure source and an outlet. A bypass valve can be provided along a bypass flow path between the pressure source and the dome, in parallel with a pilot-valve flow path that extends between the pressure source and the dome via a pilot valve. The bypass valve can be configured to automatically open the bypass flow path for flow between the pressure source and the dome only for a range of pressures at the pressure source, at the dome, or for a pressure difference between the pressure source and the dome.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 2b is a graph of example pressure and time measurements for the relief valve of FIG. 2a;

FIG. 3b is a graph of example pressure and time measurements for the relief valve of FIG. 2a;

FIG. 4b is a graph of example pressure and time measurements for the relief valve of FIG. 2a.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

As used herein, unless otherwise specified or limited, "at least one of A, B, and C," "at least one of A, B, or C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As used herein, unless otherwise specified or required, ranges are intended to include the listed bounds of the range. For example, a range of pressures between 10% and 50% of a reference pressure is intended to include 10% of the reference pressure, 50% of the reference pressure, and all pressures between those bounds.

Also as used herein, unless otherwise specified or limited, "flow capacity" refers to the capacity of a particular flow path for flow of a reference fluid at a reference state. For example, two conduits may exhibit equal flow capacities if the conduits exhibit respective cross-sectional areas, flow restrictions, surface characteristics, and so on such that a reference fluid at a reference pressure and temperature (e.g., steam at 100° C. and 1 atmosphere) flows at the same rate through the conduits with the same total pressure drop over the length of the conduits. In the context of flow capacity, unless otherwise specified of limited, "substantially equal" indicates variance of 5% or less. For example, two conduits may exhibit substantially equal flow capacities if the conduits exhibit respective cross-sectional areas, flow restrictions, surface characteristics, and so on such that a reference fluid at a reference pressure and temperature (e.g., steam at 100° C. and 1 atmosphere) flows at respective rates that differ from each other by 5% or less through the conduits with the same total pressure drop over the length of the conduits.

Conventional pilot-operated valves can provide substantial benefits, such as those described above. But certain issues can sometimes arise for conventional designs during loading of the dome (e.g., during system start-up, as may correspond to an initial loading of the dome). For example, internal components of a pilot valve may often provide somewhat constricted flow passages between a system line and a dome. This arrangement may be appropriate to comply with certain design constraints or otherwise ensure appropriate run-time operation. However, because fluid has to pass through these constricted passages to fill the main valve dome, pressure in the dome may sometimes lag line (i.e., system) pressure, particularly during initial loading of the dome. This problem can be especially pronounced in liquid applications, due to the nearly incompressible nature of liquids. Further, as a result of this pressure lag, rapid increases in system pressure can cause the main valve to open and close multiple times before the dome pressure is sufficient to hold the main valve closed. This can cause undesirable effects, including water hammers, undesired venting of line fluid, or damage to the main valve seat or other valve components.

In view of these issues, and others, it can therefore be useful to provide control arrangements for a pilot-operated relief valve that can help to load a main valve dome more quickly than may be possible with conventional designs. Embodiments of the invention can provide this benefit, among others. For example, some embodiments can include a bypass flow path with a bypass valve that is configured to automatically provide flow from a pressure source to a main valve dome of a pressure relief valve during at least part of a dome-loading operation. In some cases, such an arrangement may allow the dome to be loaded more quickly than would be possible in conventional systems, including those in which a dome is loaded only via a restricted flow path through a pilot valve that provides a main run-time conduit between a system pressure source (e.g., line pressure) and the dome.

Figure 1:
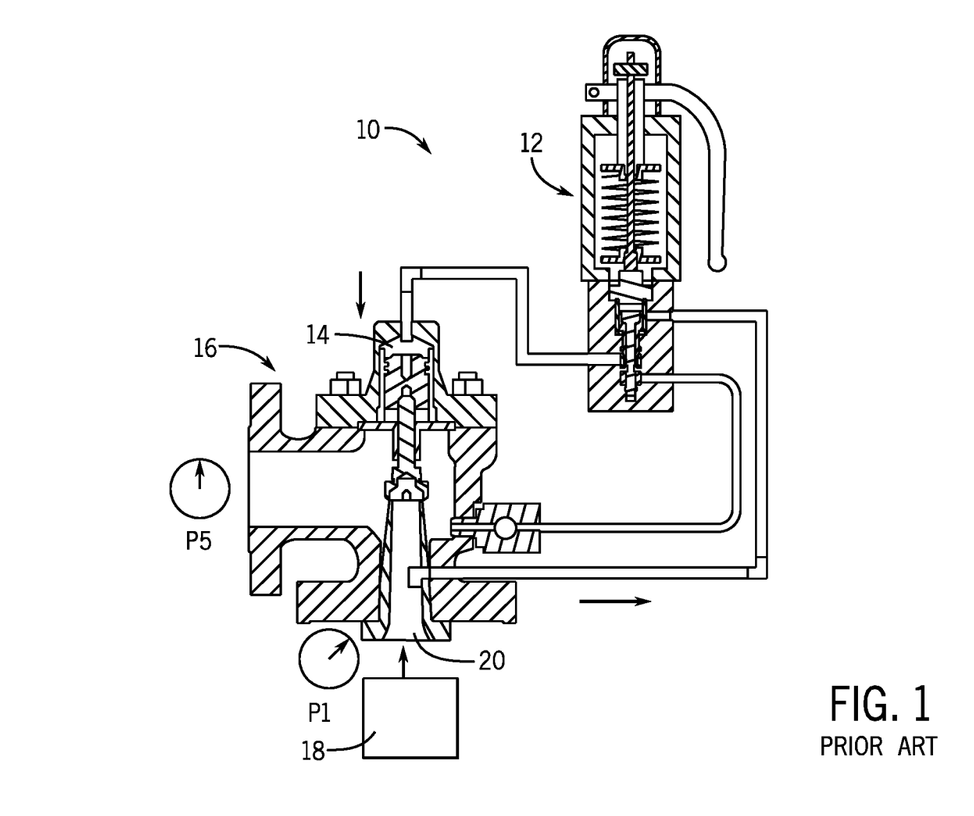
FIG. 1 is a schematic view of a conventional pilot-operated relief valve.

FIG. 1 illustrates a schematic diagram of the flow paths within a conventional pilot-operated relief valve assembly 10 when the system pressure is below the set pressure of the pilot valve 12 (and the relief valve assembly 10, generally) and the pressure in the dome 14 equals the system pressure (i.e., pressure at a pressure source 18). In the illustrated state, the dome pressure thus maintains a seal against fluid release via a main valve 16. Further, the pilot valve 12 permits flow from the system pressure source 18, through the pilot valve 12, to the dome 14, to maintain the dome at about the system pressure and thereby ensure continued seating of the main valve.

When the system pressure is near or at the pilot valve set pressure, the increase in system pressure actuates the pilot valve 12 to close the fluid pathway from the pressure source 18 through the pilot valve 12 to the main valve dome 14, thereby preventing further increase in the dome pressure. As the system pressure increases sufficiently above the dome pressure, the main valve 16 can accordingly modulate (e.g., cycle between closed and slightly open positions) to help to reduce system pressure.

As the system pressure continues to increase above the pilot valve set pressure—the main valve 16 can fully open. As a result, the over-pressurized system can be vented via the main valve 16. Further, the increased system pressure can also cause the pilot valve 12 to open a flow path to exhaust fluid from the main valve dome (e.g., into the exhaust stream of the main valve 16). This can help to ensure appropriately full lift of the main valve 16 to relieve pressure from the system. And, once the system pressure lowers to below the pilot valve set pressure, the pilot valve 12 can reset to allow flow from the system line into the dome 14, to reload the dome 14 and re-seat the main valve 16 (e.g., as shown in FIG. 1).

During certain operations, including initial loading or reloading of a main valve dome, fluid travels into the pilot valve 12 from the main valve inlet 20, through the pilot valve 12, and then into the main valve dome 14. Some segments of the flow path within the pilot valve 12 provide a relatively restricted flow path for flow of fluid from the main valve inlet 20 (and the regulated system) to the main valve dome 14. This can be helpful for some operating conditions. For example, a restricted flow path can help to prevent rapid increases or decreases in dome pressure due to spikes in system pressure, as might otherwise cause the main valve to rapidly close (e.g., as may result in water hammer effects) or to cycle inappropriately. However, as also discussed above, the restricted flow path can result in relatively slow pressurization of the dome, particularly during start-up conditions or re-loading operations after a release event. In some cases, this can lead to undesired cycling of the main valve 16 or other adverse effects.

To address this issue (or others), some embodiments of the invention can include a bypass flow path and a corresponding control arrangement. Generally, the bypass flow path can provide a relatively large capacity connection between a pressure source and a main valve dome, which can generally bypass a main, restricted flow path through an associated pilot valve. Accordingly, via flow through the bypass flow path, the dome can be pressurized to match the pressure source more quickly than would be possible, at comparable operating conditions, using the restricted pilot-valve flow path alone. Further, the control arrangement can be configured to ensure that flow through the bypass flow path is permitted only when appropriate for desired system operation (e.g., only over a particular range of pressures at a pressure source). Thus, improved speed for loading the main valve dome can be obtained, without necessarily sacrificing the benefit of more restricted flow paths to the dome—e.g., via the pilot valve—during run-time operation.

Figure 2A:
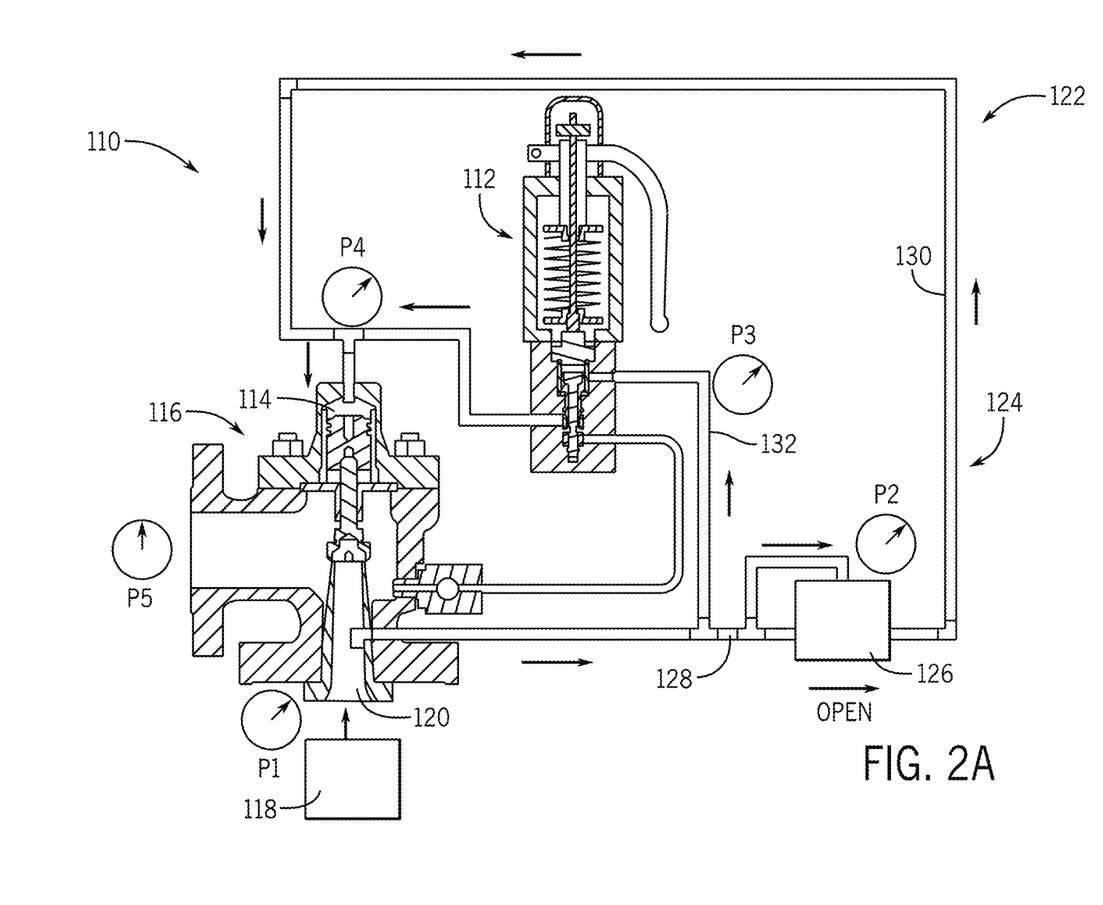
FIG. 2a is a schematic view of a pilot-operated relief valve according to an embodiment of the invention, in a first operational state.

As shown in FIG. 2a, to provide faster dome pressure loading during start-up and reloading, some embodiments of the invention provide a pilot-operated relief valve assembly 110 with a flow arrangement 122 to regulate flow from a system pressure source 118 to a main valve dome 114. The flow arrangement 122 generally operates in conjunction with a flow path to the main valve dome 114 that is defined through the pilot valve 112, to generally increase the speed with which the dome 114 can be loaded. In particular, in the embodiment illustrated, the flow arrangement 122 includes a bypass flow path 124 and a bypass valve 126 disposed along the bypass flow path 124. The bypass flow path 124 provides a flow path to communicate pressurized fluid from the pressure source 118 to the dome 114 in parallel with a main flow path through the pilot valve 112. Further, the bypass valve 126 is designed to selectively open and close the bypass flow path 124 to flow from the pressure source 118 to the dome 114, such as automatically in response to one or more ranges of input pressures. In some embodiments, for example, the opening and closing of the bypass valve 126 can be dependent on the pressure at the pressure source 118 or at the main valve dome 114. (For succinctness, some examples below focus in particular on dependency on the pressure source 118.) In this way, for example, within certain pressure ranges at the pressure source 118 (or elsewhere in the system), the pilot-operated relief valve assembly 110 may not be dependent solely on the restricted path through the pilot valve 112 to pressurize the dome 114.

In different embodiments, different arrangements of flow conduits or other components can be used to provide a bypass flow path, including, in some cases, flow conduits that are at least partly separate from an associated pilot valve. Still referring to FIG. 2a, for example, the bypass flow path 124 includes a bypass valve conduit 128 extending from the pressure source to the bypass valve 126 and a bypass valve conduit 130 extending from the bypass valve 126 to the main valve dome 114. In other embodiments, however, other configurations are possible. For example, although the bypass valve conduit 128 shares a common connection to the pressure source 118 with the pilot valve 132, in some configurations, separate taps, conduits, or other features can be provided to separately communicate pressure to a pilot valve and to a bypass valve. As another example, in some embodiments, conduits for a bypass flow path may form part of a larger assembly (e.g., of a pilot valve) or may otherwise exhibit different routing than is illustrated in FIG. 2a.

In some embodiments, a bypass flow path can provide enlarged flow capacity relative to a flow path to a dome via a pilot valve. For example, in the configuration illustrated in FIG. 2a, the bypass valve conduits 128, 130 are larger in cross-section than relevant flow paths within the pilot valve 112 (e.g., as may solely charge the dome 114 in conventional arrangements, as discussed relative to FIG. 1). In some embodiments, the bypass valve conduits 128, 130 can be at least the size of a pilot conduit 132 that connects the pressure source 118 and the pilot valve 112. In some examples, the pilot conduit 132 and the bypass valve conduits 128, 130 have substantially equal flow capacities. Other examples can include one or more bypass valve conduits (or a bypass flow path, in general) that have respective flow capacities that are two to three (or more) times greater than flow capacities of a pilot conduit (or a main pilot valve flow path, in general).

In some embodiments, a bypass valve can be a one-way valve, including as may be useful to permit flow only from a pressure source to a main valve dome and thus prevent backflow from the dome via the bypass flow path. For example, the bypass valve 126 is a one-way valve configured to provide flow from the pressure source 118 to the dome 114 and to prevent back flow from the pilot valve 112. In other embodiments, however, other configurations are possible. For example, other types of one-way valves than shown in FIG. 2a can be used for a bypass valve, or a one-way valve (e.g., a check valve) may be disposed at other locations along a bypass flow path, including upstream or downstream of a bypass valve that is configured to selectively allow fluid flow to the dome based on system (or other) pressure.

As also noted above, in some embodiments, a bypass valve can be configured to open a bypass flow path automatically, based upon pressure at a pressure source or at another location (e.g., at a main valve dome), to permit flow from the pressure source to the dome via the bypass flow path. In some examples, this can accomplished through the bypass valve being directly actuated by fluid pressure from the pressure source, such as illustrated in FIG. 2a for the bypass valve 126. In other embodiments, other configurations are possible. For example, in some cases, a bypass valve can be structured as any variety of pilot-operated valves, can include a spring-operated check valve, and so on. In some cases, a bypass valve can be indirectly actuated based on system pressure (i.e., can operate based on a signal that is itself based on, but distinct from, a pressure signal from a system pressure source).

Generally, a variety of configurations are possible for a bypass valve, including configurations employing spring-operated, pilot-operated, or other valves, according to known technologies, that can selectively provide appropriate opening and closing of a bypass valve based on system or dome pressures to permit or prevent bypass flow, In the illustrated example, the bypass valve 126 is shown as a single pressure-operated valve. In other embodiments, a bypass valve can be configured as a valve assembly that includes multiple distinct valves. In some embodiments, a bypass valve can be electrically operated (e.g., via a controllable solenoid) or pilot-operated based on pressure from other sources than are illustrated in FIG. 2a (e.g., the dome 114).

With regard to the function of the bypass valve 126 and the flow arrangement 122 generally, FIGS. 2a-4b illustrate the potential fluid flow at various stages of system pressurization, and corresponding representative graphs of example system pressure 150, plotted as a percentage of set pressure of the pilot valve 112 (and of the pilot-operated relief valve 110, generally) measured over time.

As also noted above, in some arrangements, the bypass valve 126 can be configured to open when the pressure 150 at the pressure source 118 reaches a predetermined opening threshold, and close when it reaches a predetermined closing threshold. Thus, for example, the bypass valve 126 can be controlled to contribute to faster loading of the dome 114 when the pressure source 118 is at particular pressures (e.g., early in an initial dome loading operation) but not to contribute to loading of the dome 114 at other times (e.g., as system pressure begins to approach a set point, a threshold percentage of a set point, or another threshold).

Figure 2B:
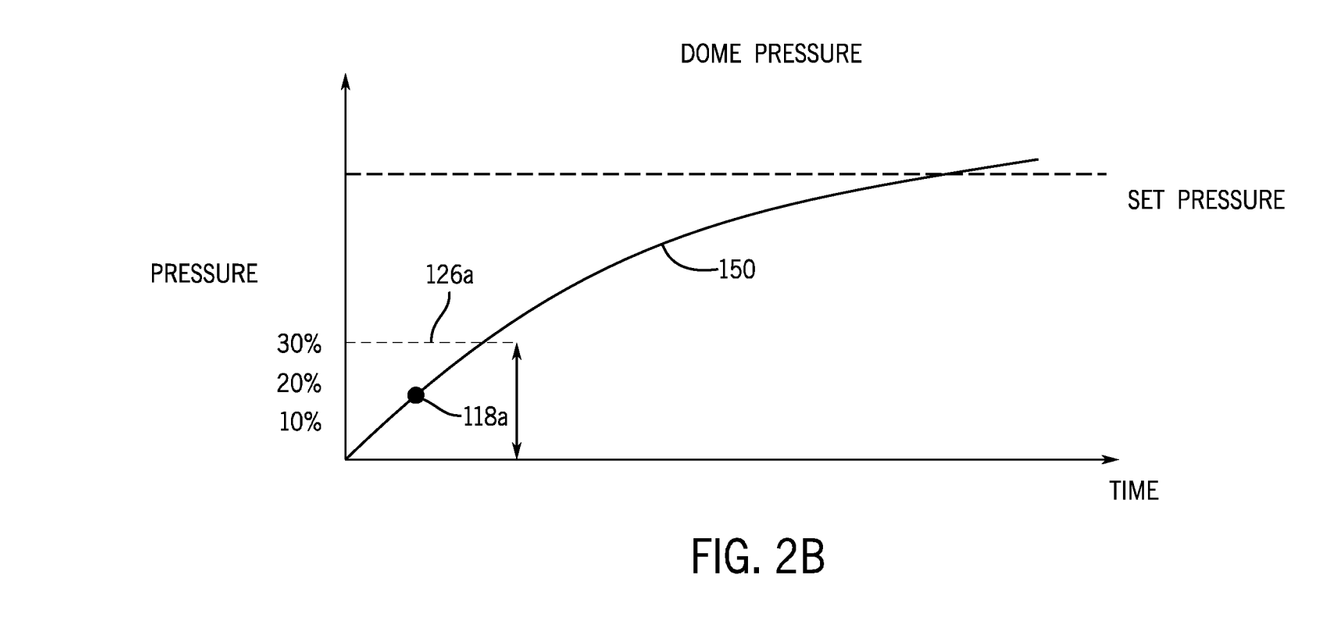

In the illustrated example, FIGS. 2a-2b show the pilot-operated relief valve assembly 110 during system start up, when the main valve dome 114 is first being pressurized and, for example, a system pressure 118a has been reached (see FIG. 2b). (Although the described operations may be particularly useful during initial dome loading, similar conditions may also occur when the valve dome 114 is being re-pressurized after a relief event.)

In this example, an opening threshold is depicted to be at or around zero percent of the pilot valve set pressure (e.g., at zero gauge pressure), such that the bypass valve 126 is initially open to permit flow to the dome 114 as the initial loading of the dome 114 begins, although other approaches are possible. Further, as generally discussed above, the bypass flow path 124 is configured to load the dome 114 in combination with a parallel dome-loading flow path through the pilot valve (e.g., including the pilot conduit 132. With this arrangement, during the initial-loading stage of operation, as illustrated in FIG. 2a, the bypass valve 126 and the pilot valve 112 are open for flow from the pressure source 118 to the dome 114. Accordingly, fluid can flow to the dome 114 from the pressure source 118 via the pilot valve 112 and the bypass flow path 124 in parallel, as regulated, respectively, by the bypass valve 126 and internal components of the pilot valve 112 (e.g., according to any of a variety of known pilot-valve designs). As noted above, the flow capacity of the bypass flow path 124 may be relatively large, as compared to the pilot valve 112. Accordingly, due to the open state of the bypass valve 126, pressure at the dome 114 may closely track pressure at the pressure source 118 with relatively little lag, and cycling of the valve 116 between open and closed positions (e.g., as discussed above) may be largely avoided.

Figure 3A:
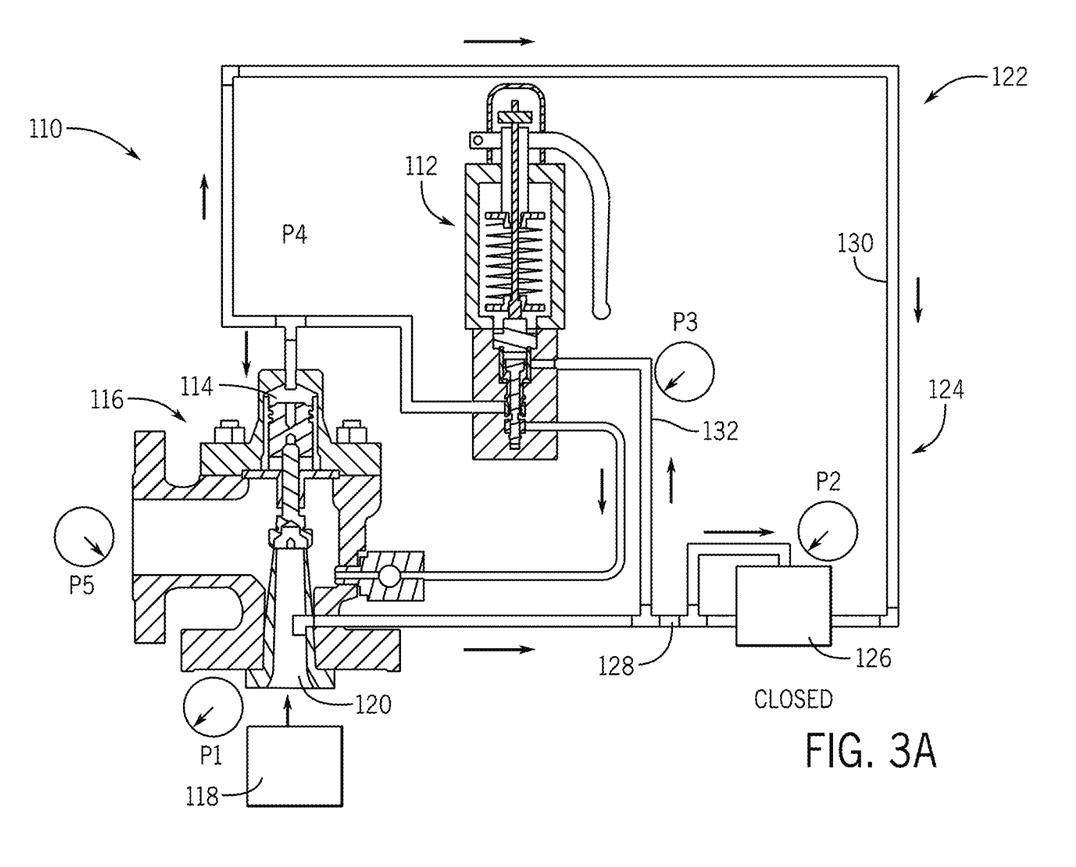
FIG. 3a is a schematic view of the pilot-operated relief valve of FIG. 2a, in a second operational state.
Figure 3B:
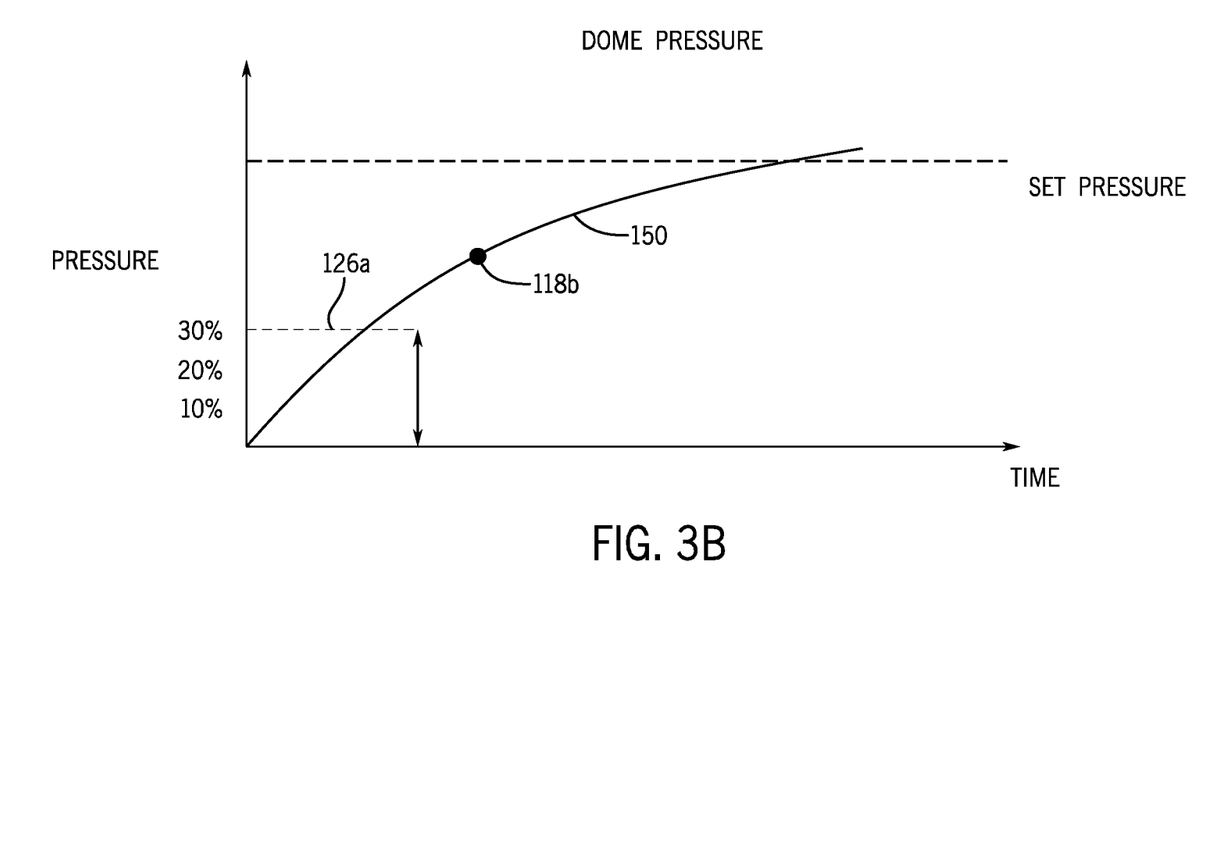

In some embodiments, a bypass valve may be configured to close, to block flow through a bypass flow path, once an input (e.g., system) pressure reaches a particular threshold or otherwise exceeds a particular pressure range. For example, FIGS. 3a-3b show the pilot-operated relief valve assembly 110 once the pressure at the pressure source 118 has exceeded a predetermined closing threshold 126a (e.g., with the pressure source at a pressure 118b, as shown in FIG. 3b). At this stage of operation, because system pressure has exceeded the closing threshold 126a, the bypass valve 126 has closed and the pilot valve 112 has assumed sole control of pressurizing of the dome 114 via the pilot conduit 132. Accordingly, as illustrated in FIG. 3a, fluid can flow from the pressure source to the dome 114 via the pilot valve 112, but cannot flow from the pressure source to the dome 114 via the bypass flow path 124 (and, in particular, via the conduit 130). In some embodiments, as the pressure at the dome 114 continues to increase, some back flow from the dome 114 along the conduit 130 may occur, although overall effects of this back flow on system performance (e.g., due to loss of pressure in the dome 114) may be relatively minimal, including due to appropriately configured one-way operation of the bypass valve 126 and appropriate sizing of the conduit 130.

Figure 4A:
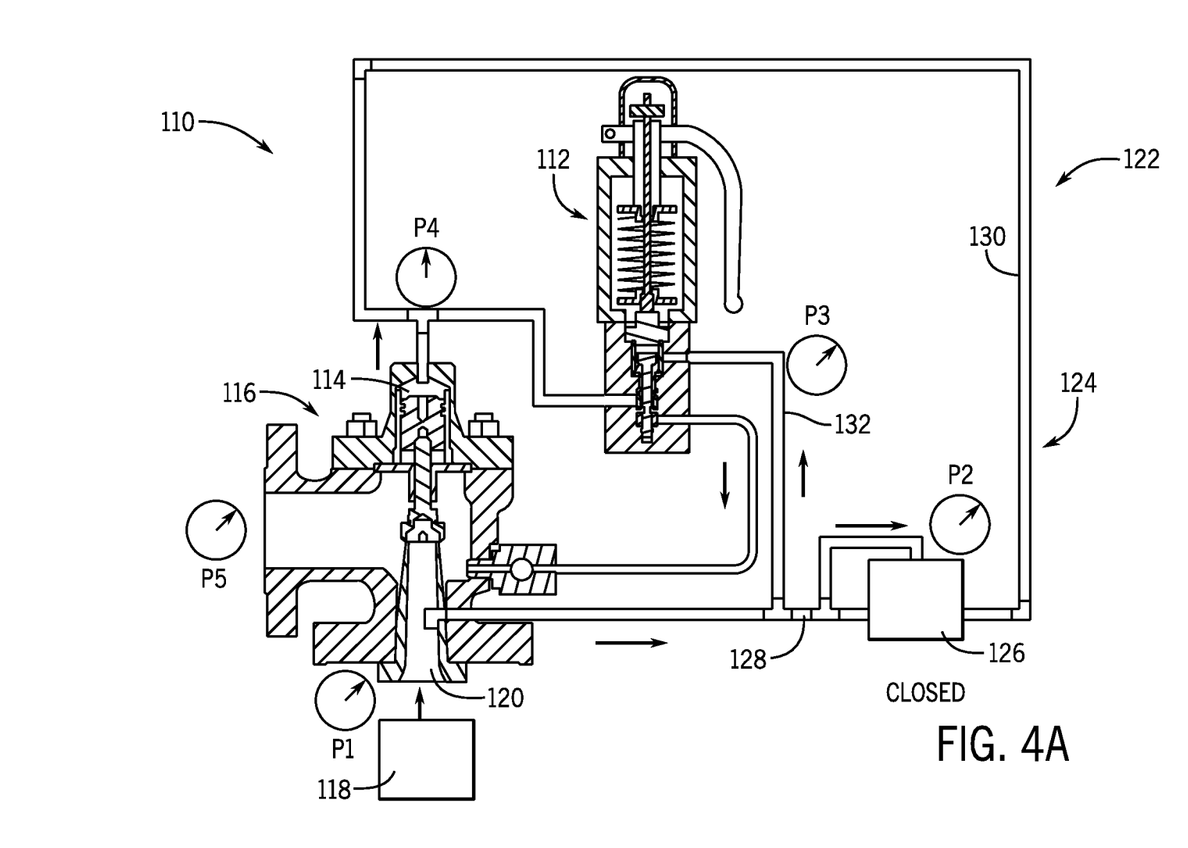
FIG. 4a is a schematic view of the pilot-operated relief valve of FIG. 2a, in a third operational state.
Figure 4B:
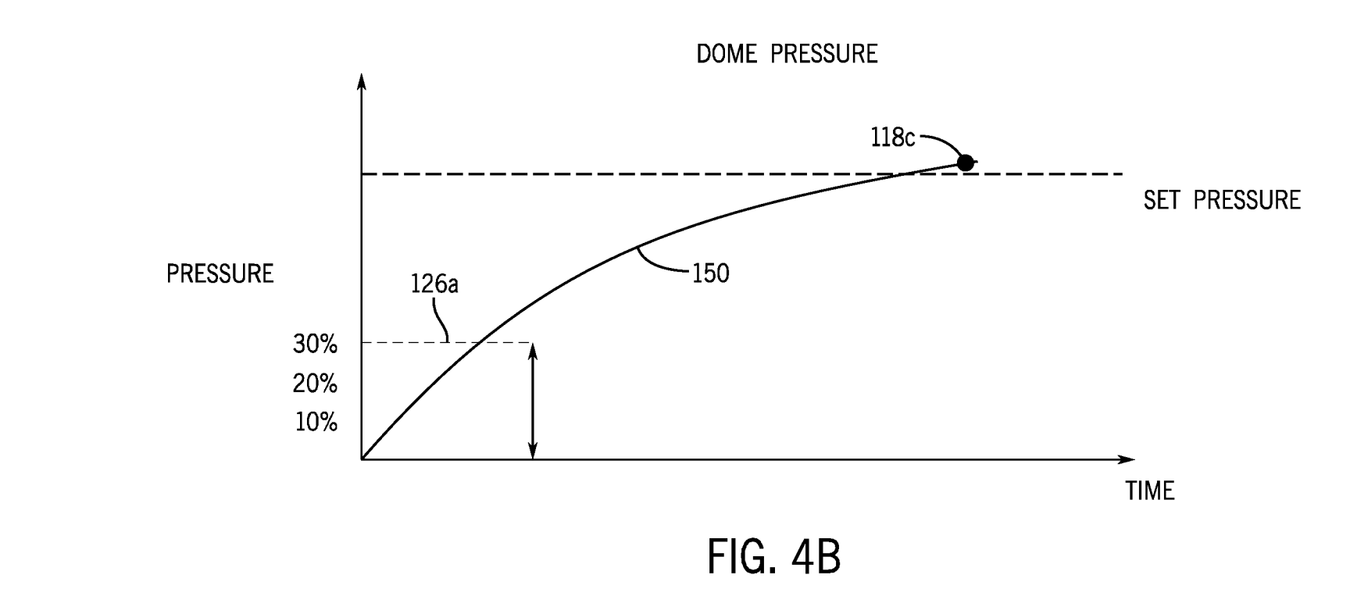

Continuing, in the illustrated example, the bypass valve 126 remains closed as the pressure at the pressure source 118 continues to rise, including when the pressure source reaches a pressure 118c that is above the set pressure of the pilot valve 112, as illustrated by FIGS. 4a-4b. Once the set pressure is exceeded, the pilot valve 112 causes the dome pressure to be relieved (e.g., as discussed above), and, the main valve 116 can thus fully open to relieve the system pressure. After the relief event, the bypass valve 126 may remain closed unless the pressure at the pressure source 118 drops below the relevant closing threshold (e.g., the threshold 126a). In this regard, for example, fluid may flow from the dome 114 through the pilot valve 112 to the outlet of the main valve 116, with any residual pressurized fluid within the bypass conduit 130 being similarly released.

Thus, for example, through interoperation of the pilot valve 112 and the bypass valve 126, overpressure at the pressure source 118 can be generally relieved and the flow arrangement 122 can be reset for further operation. For example, some relief events can decrease the system pressure to below the closing threshold 126a, and the bypass valve 126 can accordingly re-open for flow from the pressure source 118 to the dome 114. In other relief events, however, system pressure may not necessarily decrease below the closing threshold 126a and, thus, the bypass valve 126 may remain closed, such that the dome 114 may be loaded solely via the main flow path through the pilot valve 112.

Figure 5:
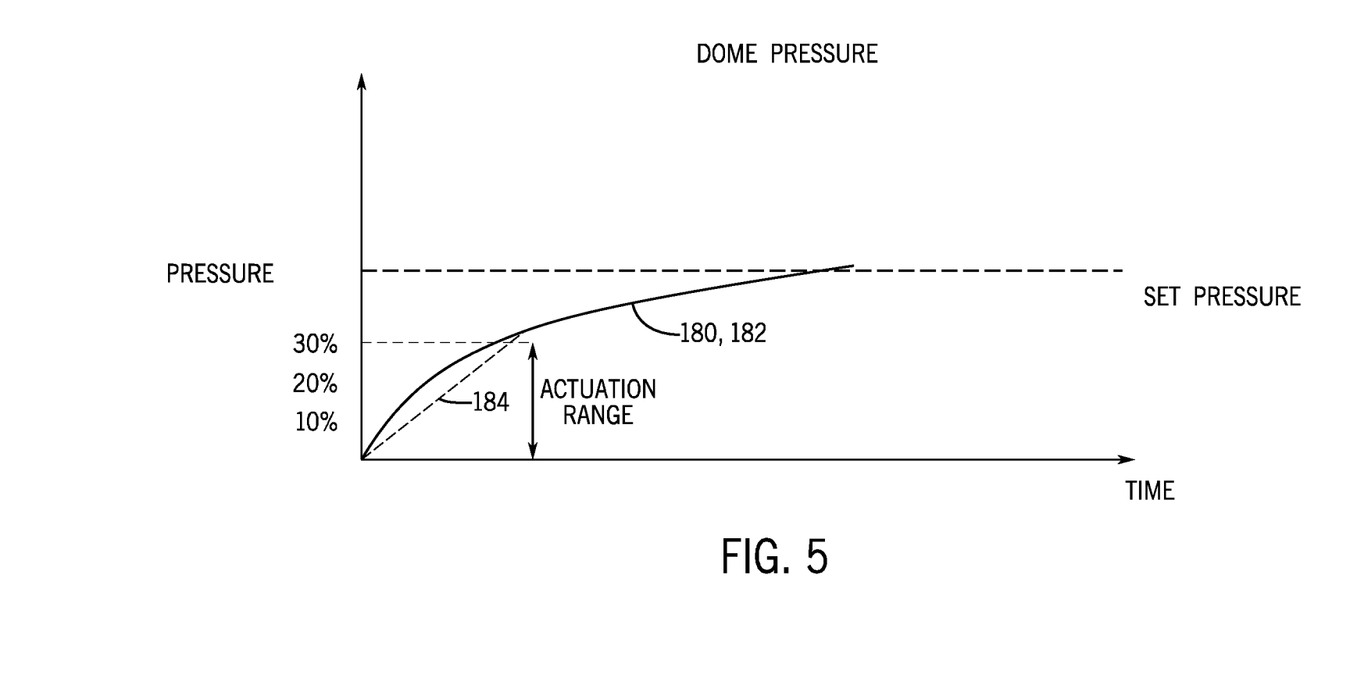
FIG. 5 is a graph of example pressure and time measurements for a pilot-operated relief valve according to an embodiment of the invention.

In some embodiments, operation of a bypass flow arrangement (e.g., the flow arrangement 122) can result in substantially faster loading of a main valve dome than may be possible with conventional systems. For example, the graph in FIG. 5 compares the increase in dome pressure during dome loading, as provided by a conventional pilot-operated relief valve, with the increase in dome pressure during dome loading, as provided by an example pilot-operated relief valve having a bypass flow path according to an embodiment of the invention. As shown in FIG. 5, when a bypass flow arrangement (e.g., the flow arrangement 122) has been implemented, a pressure 180 at the pressure source may increase substantially identically as a pressure 182 at a main valve dome (e.g., at substantially the same rate over the same time period, as limited by the speed of pressure wave propagation through the system). In contrast, use of a conventional system without a bypass arrangement (e.g., as in FIG. 1) may result in a lag of dome pressure 184 behind the system pressure 180, particularly during initial loading of the dome. Thus, for the example shown and others, using a pilot-operated relief valve with a bypass flow arrangement can result in a dome pressure 182 that experiences substantially quicker initial dome pressurization than may occur with a conventional arrangement without a bypass flow arrangement (i.e., as shown dome pressure 184). Indeed, in some examples, the dome pressurization lag can be virtually eliminated through the use of an embodiment of the disclosed bypass system.

As also discussed above, mismatch between dome and system pressure, particularly during initial dome loading, can result in undesirable effects, including unwanted modulation of a main valve. Due to the pressure-tracking benefits provided by some embodiments, as illustrated in FIG. 5 for example, use of pilot-operated relief valves according to some embodiments of the invention can help to avoid this mismatch and the corresponding adverse effects.

In different embodiments, a bypass valve can be configured to operate based on different actuation ranges (e.g., different pressure ranges between relevant opening and closing thresholds for a bypass valve). For the embodiments illustrated in FIGS. 2a through 5, for example, the relevant bypass valves have an actuation range spanning from 0% to 30% of the pilot valve set pressure. Accordingly, as also discussed above, when the pressure of the pressure source is between 0% and 30% of the set pressure, the relevant bypass valves can provide supplemental flow capacity to help pressurize the dome. Further, when the pressure of the pressure source is outside of 0% and 30% of the set pressure, the relevant bypass valves can be closed, with the pilot valve assuming full control of dome pressurization. Thus, the fast-loading benefit illustrated for the dome pressure 182 in FIG. 5 may occur primarily during the actuation range of 0% to 30% of pilot set pressure.

Figure 6:
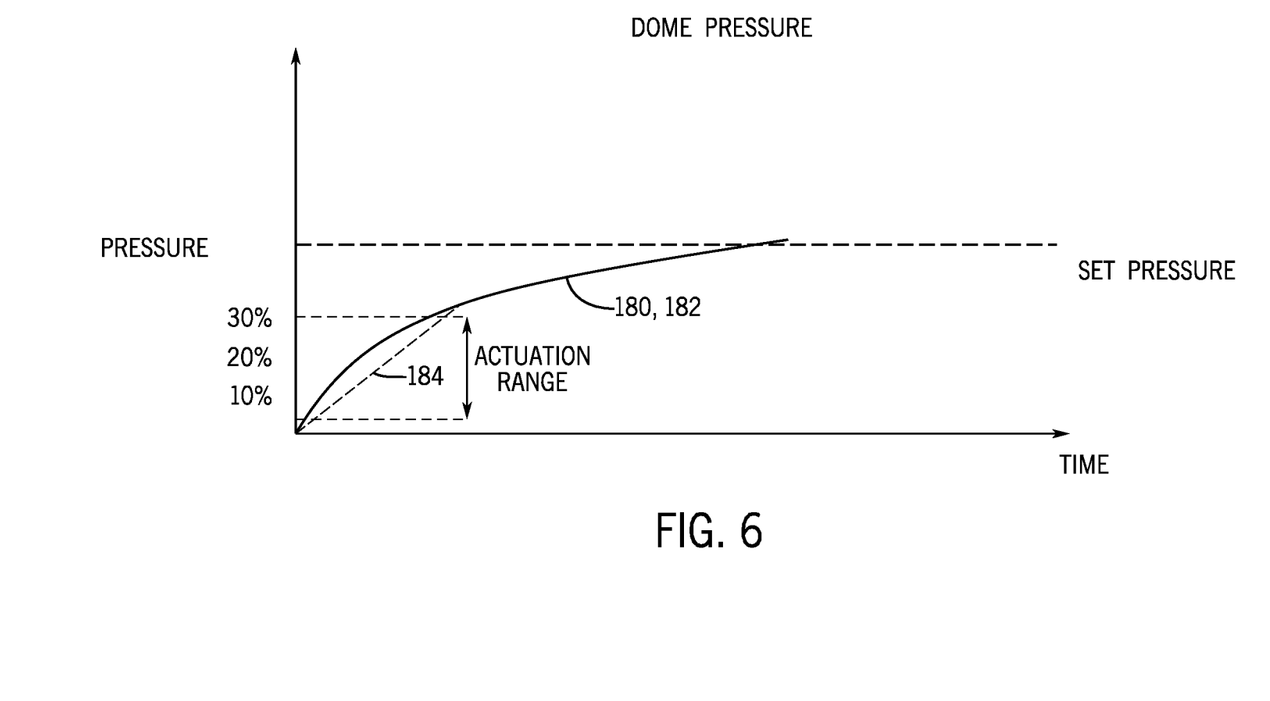
FIG. 6 is a graph of example pressure and time measurements for a pilot-operated relief valve according to an embodiment of the invention.

In other embodiments, other configurations are possible. For example, some embodiments can have a bypass valve actuation range (or an actuation threshold) that is different from 0% to 30% of set pressure, including with pressure thresholds that are calculated in a variety of ways (e.g., as a varying quantity or not as a percentage of system set pressure). In some embodiments, a bypass valve can be configured to operate within an actuation range with a non-zero lower bound, such as 10% of set pressure (as shown in FIG. 6). This may be useful, for example, in order to protect against inadvertent loading of the dome during certain system failure modes. In this regard, for example, the opening range of a bypass valve can span from a pressure that is 0% to 50% of the pilot valve set pressure, 0% to 30% pilot valve set pressure, 10% to 50% of the pilot valve set pressure, or 10% to 30% (as shown in FIG. 6) of the pilot valve set pressure, and so on. In some embodiments, the range of pressure source pressures at which the bypass valve closes can span from a non-zero transition (e.g., closing) pressure up to any appropriate value below the pilot valve set pressure.

In some embodiments, a bypass valve can have an adjustable actuation pressure range to provide a plurality of pressure thresholds or ranges, which can be calculated and set in a variety of ways. As also mentioned above, in some embodiments the bypass valve can be configured to open after an opening threshold is met and close after a closing threshold is met, and each threshold can be a predetermined percentage or fraction of the pilot valve set pressure. Similarly, in some embodiments, a bypass valve can be configured to open when the pressure at the pressure source spans across a first range of pressures and to close through a second range of pressures. In these embodiments, for example, the opening threshold can be a zero or non-zero pressure or, similarly, the open range can span from a zero or non-zero pressure to a higher pressure. Similarly, a closing threshold can be set to any number of constant or variable pressure values.

In some embodiments, a fail-closed bypass valve can be employed to ensure appropriate relief operation of a system in the event of certain system failures. In this way, for example, if a bypass valve mechanically or otherwise fails and stops responding to the pressure at the pressure source, the bypass valve will not continue to pressurize the dome and potentially prevent relief of overpressure. In such embodiments, the bypass valve may be internally or externally piloted such that the system pressure itself is used to actuate the bypass valve to the open position when system pressure is within the actuation range. In other embodiments, a separate actuation supply (e.g., instrument air) may be used to actuate the bypass valve. For example, instrument air may be routed through a bypass pilot valve that is actuated based on system pressure such that the instrument air actuates the bypass valve to the open position when system pressure is within a defined actuation range.

In some embodiments, the bypass valve may be actuated as a function of a rate of change in input pressure rather than as a function of static input pressure. For example, a bypass system as disclosed herein may sometimes be particularly useful in startup conditions under which system pressure is rapidly increasing. Thus, for example, rather than (or in addition to) actuating the bypass valve to an open position based on static system pressure, the bypass valve could be actuated to open when a rate of increase in system pressure exceeds a threshold (e.g., a predetermined threshold rate corresponding to a particular system condition). In some cases in which a bypass valve is controlled based on the rate of increase in system pressure, static system pressure may also be considered, such as may be useful to prevent the bypass valve from opening to pressurize the dome when system pressure rapidly increases outside of a startup condition. For example, a bypass valve may be opened only when static system pressure is less than a static system pressure threshold and the rate of increase in system pressure is greater than a rate threshold.

In some embodiments, a bypass valve may be actuated based on a pressure difference across the associated pilot valve, including a pressure difference between a pressure source (e.g., system pressure) and a dome of a main valve of a pressure relief valve assembly. For example, because a high pressure difference on opposing locations relative to the pilot may indicate that the pilot valve is acting as a limiting flow restriction, this pressure difference can provide an indication that the bypass flow path would be useful in assisting to load a main valve dome. This may be seen, in some cases, as a large pressure difference between a main valve dome and a pressure source, corresponding to a relatively substantial pressure lag between the pressure source and the dome. Here, again, static system pressure (or other factors) may sometimes be considered in addition to the pressure difference to avoid undesired actuation of the bypass valve outside of a startup condition.

It should be noted that the graphs of FIGS. 2b, 3b, 4b, 5 and 6 are not necessarily to scale or representative of the only possible operational characteristics of a pilot-operated relief valve according to embodiments of the invention. In some embodiments, the pressure curves may depart (significantly in some embodiments) from the illustrated pressure versus time curve shown in the examples, including depending on the mechanical characteristics of the relevant valve (s), the properties of the fluid used in the system, and other factors. For example, in some instances, the dome pressure in a conventional system (e.g., as with dome pressure 184 in FIGS. 5 and 6) may not recover from the initial pressurization lag and come into alignment with the dome pressure of a pilot-operated relief valve according to an embodiment of the invention at a similar pressure or time as illustrated in the various FIGS.

Generally, bypass arrangements according to embodiments of the invention, including bypass valves and flow paths, may be customizable to a number of different relief valve models and applications. For example, in different configurations, a bypass arrangement can be manufactured as part of, and sold and installed collectively with, a pilot-operated relief valve as a unit, or can be configured to be installed as a retrofit arrangement for an existing relief valve system. In some embodiments, the potentially stand-alone configuration of a bypass flow arrangement, relative to an associate pilot valve, may render the invention particularly suitable for use as a retrofit system.

Thus, embodiments of the disclosed invention can provide improvements over conventional valve assemblies, including conventional pilot-operated relief valve assemblies. For example, some embodiments provide a bypass flow path that can assist in rapidly pressurizing or re-pressurizing a main valve dome of a pilot-operated relief valve, including during initial dome loading or during dome re-loading after a relief event. For example, some bypass flow arrangements according to the invention can include a bypass valve that ensures that a large-capacity dome-loading bypass flow path is open during relevant times for dome pressurization, but otherwise closed. Embodiments of the invention can, therefore, reduce or eliminate the undesirable effects of dome pressurization lag, among other benefits.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A flow arrangement for use with a pilot-operated relief valve that is disposed between a pressure source and an outlet and that includes a pilot valve, the flow arrangement comprising:
   a dome;
   a pilot-valve flow path from the pressure source to the dome;
   a bypass flow path extending from the pressure source to the dome; and
   a bypass valve disposed along the bypass flow path between the pressure source and the dome; the bypass valve being configured:
      so that the bypass valve automatically opens the bypass flow path to flow between the pressure source and the dome in parallel with the pilot-valve flow path and increases pressure at the dome in parallel with the pilot-valve flow path, based on a pressure difference between the pressure source and the dome exhibiting a first range of pressures; and
      so that the bypass valve automatically closes the bypass flow path to flow between the pressure source and the dome, based on the pressure difference between the pressure source and the dome exhibiting a second range of pressures that is lower than the first range of pressures.

2. The flow arrangement of claim 1, wherein the bypass valve is a one-way valve configured to permit flow from the pressure source to the dome and to prevent flow from the dome to the pressure source.

3. The flow arrangement of claim 1, with the pilot valve having a set pressure, wherein the first range of pressures is between 0% and 50% of the set pressure.

4. The flow arrangement of claim 3, wherein the first range of pressures is between 10% and 50% of the set pressure.

5. The flow arrangement of claim 4, wherein the first range of pressures is between 10% and 30% of the set pressure.

6. The flow arrangement of claim 3, wherein the first range of pressures is between 0% and 30% of the set pressure.

7. The flow arrangement of claim 1, wherein the pilot-valve flow path includes a first conduit extending between the pressure source and the pilot valve; wherein the bypass flow path includes a second conduit extending between the pressure source and the bypass valve; and wherein the first conduit and the second conduit have substantially equal flow capacities.

8. The flow arrangement of claim 7, wherein the bypass flow path includes a third conduit extending between the bypass valve and the dome; and wherein the second and third conduits have substantially equal flow capacities.

9. The flow arrangement of claim 1, with the pilot-operated relief valve having a set pressure, wherein the second range of pressures corresponds to pressure at the pressure source between a non-zero transition pressure and the set pressure and the first range of pressures corresponds to pressure at the pressure source below the non-zero transition pressure.

10. The flow arrangement of claim 1, wherein the bypass flow path is configured to provide flow from the pressure source to the dome, to simultaneously load the dome, in parallel and in combination with the pilot-valve flow path.

11. A relief valve assembly, comprising:
    a relief valve having a dome, an inlet of the relief valve being in fluid communication with a pressure source of a flow system, wherein the dome is configured such that the dome is pressurized by the pressure source and controls flow between the pressure source and an outlet of the relief valve;

a pilot valve;

a pilot-valve flow path extending between the pressure source and the dome via the pilot valve, such that the pilot valve is in fluid communication with the pressure source and the dome along the pilot-valve flow path, the pilot valve being configured such that the pilot valve automatically opens or closes the pilot-valve flow path between the pressure source and the dome based on changes in pressure at the pressure source;

a bypass flow path extending between the pressure source and the dome, in parallel with the pilot-valve flow path; and a bypass valve disposed along the bypass flow path between the pressure source and the dome, wherein the bypass valve is configured such that the bypass valve automatically opens the bypass flow path, based upon pressure at the pressure source, pressure at the dome, or a pressure difference between the pressure source and the dome, fluidly coupling the pressure source and the dome so that the dome is loaded by being simultaneously pressurized via parallel flow from the pressure source to the dome along the bypass flow path and pilot-valve flow path.

12. The relief valve assembly of claim 11, wherein the bypass valve is configured to open the bypass flow path during initial loading of the dome.

13. The relief valve assembly of claim 12, wherein the bypass valve is configured to open the bypass flow path based upon pressure at the pressure source, pressure at the dome, or the pressure difference between the pressure source and the dome increasing to a predetermined opening threshold.

14. The relief valve of claim 12, wherein the bypass valve is configured to close the bypass flow path upon pressure at the pressure source, pressure at the dome, or the pressure difference between the pressure source and the dome increasing to a predetermined closing threshold.

15. The relief valve assembly of claim 12, wherein the bypass valve is configured to one or more of: open the bypass flow path based on pressure at the pressure source, pressure at the dome, or the pressure difference between the pressure source and the dome increasing to a predetermined opening threshold; or close the bypass flow path based upon pressure at the pressure source, pressure at the dome, or the pressure difference between the pressure source and the dome increasing to a predetermined closing threshold; and wherein one or more of the predetermined opening threshold or the predetermined closing threshold is a predetermined fraction of a set pressure of the relief valve.

16. The relief valve assembly of claim 11, wherein the pilot-valve flow path includes a first conduit extending between the pressure source and the pilot valve; and wherein the bypass flow path includes a second conduit extending between the pressure source and the bypass valve, the second conduit having a flow capacity that is greater than a flow capacity of the first conduit.

17. A method of loading a dome of a pilot-operated relief valve that is disposed between a pressure source and an outlet, the method comprising:

providing a bypass valve along a bypass flow path between the pressure source and the dome, in parallel with a pilot-valve flow path that extends between the pressure source and the dome via a pilot valve; and configuring the bypass valve such that the bypass valve automatically opens the bypass flow path for flow between the pressure source and the dome only for a range of pressures at the pressure source, at the dome, or for a pressure difference between the pressure source and the dome, wherein, when the bypass valve is open, the dome is simultaneously loaded via parallel flow from the pressure source along the bypass flow path and pilot-valve flow path.

18. The method of claim 17, wherein the range of pressures includes one or more of: a lower bound at a first predetermined percentage of a set pressure of the pilot-operated relief valve; or an upper bound at a second predetermined percentage of the set pressure of the pilot-operated relief valve; and wherein the second predetermined percentage is greater than the first predetermined percentage.

19. The method of claim 18 further comprising: configuring the bypass valve to automatically close the bypass flow path when pressure at the pressure source, pressure at the dome, or the pressure difference between the pressure source and the dome exceeds the upper bound, so that flow to load the dome is provided along only the pilot-valve flow path via the pilot valve.

20. The method of claim 19, wherein the set pressure of the pilot-operated relief valve is a percentage of a system set pressure.

\* \* \* \* \*